United States Patent [19]

Matsushima et al.

[11] Patent Number: 5,467,630
[45] Date of Patent: Nov. 21, 1995

[54] METHOD FOR WORKING TERMINAL PART OF MATERIAL FOR VERTICAL SUSPENSION TYPE SURFACE TREATMENT

[75] Inventors: Kiyomitsu Matsushima, Kurobe; Katsuyuki Nagata, Uozu, both of Japan

[73] Assignee: Yoshida Kogyo K.K., Tokyo, Japan

[21] Appl. No.: 998,926

[22] Filed: Dec. 30, 1992

[30] Foreign Application Priority Data

Dec. 30, 1991 [JP] Japan ................... 3-360380

[51] Int. Cl.$^6$ .................................................. B21C 35/04
[52] U.S. Cl. ........................... 72/254; 72/257; 72/331
[58] Field of Search ........................ 72/254, 257, 331; 83/214, 471.1, 518, 862, 863, 865

[56] References Cited

U.S. PATENT DOCUMENTS

| | | | |
|---|---|---|---|
| 1,391,912 | 9/1921 | Simpson et al. | 72/331 |
| 1,666,344 | 4/1928 | Ovestrud | 83/518 |
| 2,417,617 | 3/1947 | Schuchardt | 83/862 |
| 3,263,465 | 8/1966 | Way et al. | 72/331 |
| 3,267,711 | 8/1966 | Anderson | 72/254 |
| 3,442,000 | 5/1969 | Dombos | 72/254 |

FOREIGN PATENT DOCUMENTS

| | | | |
|---|---|---|---|
| 55-6120 | 2/1980 | Japan . | |
| 55-6119 | 2/1980 | Japan . | |
| 190918 | 7/1992 | Japan | 72/257 |

*Primary Examiner*—Lowell A. Larson
*Attorney, Agent, or Firm*—Hill, Steadman & Simpson

[57] ABSTRACT

A method for working terminal parts of materials subjected to vertical suspension type surface treatment thereby forming in the terminal parts such hook engaging parts as to be engaged with nipping devices of a carrier bar serving to convey the materials successively to a series of surface-treating baths is disclosed. This method is characterized in that the formation of the hook engaging part in the terminal part of the material is carried out at the same time that or after the step of cutting an extruded material into a fixed length is performed. The hook engaging part may be a groove, notch or hole formed in the terminal part of the fixed-length material and may be formed by a cutting or pressing work. In another embodiment, a protuberant hook engaging part is formed by welding on the surface of the terminal part of the fixed-length material while the material is in transit to a inspection table.

10 Claims, 9 Drawing Sheets

METHOD FOR WORKING TERMINAL PART OF MATERIAL FOR VERTICAL SUSPENSION TYPE SURFACE TREATMENT

BACKGROUND OF THE INVENTION

1. Field of the Invention

This invention relates to a method for working terminal parts of materials for the vertical suspension type surface treatment. More particularly, this invention relates to a method for working terminal parts, which at the same time that or after the fresh extruded material is cut into fixed lengths as materials for the surface treatment, forms in the terminal parts of the cut materials such hook engaging parts as to be engaged with nipping devices of a carrier bar serving to convey the materials as vertically suspended therefrom successively through a series of surface-treating baths.

2. Description of the Prior Art

It is widely known that as a measure to surface-treat such long materials as extruded profiles of aluminum, the method of vertical suspension type surface treatment which comprises vertically suspending materials under treatment from a carrier bar provided at the opposite terminal parts thereof with electrode contacts and causing the carrier bar to convey the materials successively through a series of surface-treating baths such as degreasing bath, rinsing bath, and electrolytic bath and dip them severally in these surface-treating baths to consequently form an anodic oxide film and a colored oxide film thereon has been developed and adopted for actual use. Heretofore, since the work of attaching the materials yet to be treated to the carrier bar on the loading side for supplying the materials has consisted of attaching suspending jigs capable of nipping a given object after the fashion of a clip one each to the materials under treatment and then hooking the suspending jigs one each on the conducting bars disposed on the lower surface of the carrier bar along the longitudinal direction thereof, it necessitates appreciable amounts of time and labor. Further this work is extremely complicate and is deficient in efficiency because it is destined to handle a large number of materials. Thus, for a plant specializing in surface treatment, the work has constituted itself a major obstacle to the series of rationalizing steps taken to fulfill the most important tasks of saving labor and enhancing efficiency.

Further, the work of racking the materials under treatment by the use of the conventional suspending jigs has consisted solely in causing the suspending jigs to take hold of these materials by nipping their leading terminal parts after the fashion of a clip, it entails the possibility of the seized materials accidentally slipping off the suspending jigs when the carrier bar is raised upright to suspend the materials in a vertical direction or when the carrier bar is raised or lowered for the purpose of conveyance to the surface-treating baths or immersion in the baths. The fact that the suspending jigs are incapable of generating an ample nipping and retaining force possibly entails the phenomenon of impairing electric conduction during the electrolytic treatment.

For the purpose of solving these problems, Japanese Patent Publications No. 55-6119 (6,119/1980) and No. 55-6120 (6,120/1980) propose a method for racking the materials under treatment by forming a notch in the terminal part of each material under treatment in-mid course of the conveyance on a conveyor disposed immediately in front of a framing station and causing a hooking part formed at the leading terminal of a depressing member (or a supporting plate) of a material nipping device (suspending jig) to be hooked in the notch. The teachings of said patent literatures are hereby incorporated by reference. The patent publications mentioned above further disclose a racking apparatus which is capable of automatically racking the materials under treatment to the carrier bar by leveling down the carrier bar toward the loading side for supplying the materials under treatment, causing the notch to be formed in the terminal part of the material while the material is in transit in the lateral direction toward the carrier bar, allowing the hooking part at the leading terminal of the depressing member of the nipping device fixed to the carrier bar to engage with the notch, then raising the carrier bar upright by a tumbler lifter, and loading it on the conveyor. The materials suspended by the carrier bar are forwarded by the conveyor successively to the series of surface-treating steps such as the step for rinsing with water and the step for electrolysis.

The racking method disclosed in said Japanese Patent Publications No. 55-6119 and No. 55-6120 indeed fulfill the requirement for enhancing the efficiency of the racking work and preventing the possible accidental fall of the materials under treatment. The mere automation of the racking step, however, does not always lead to full automation of the whole operation ranging from the step of extrusion through the step of surface-treatment. The racking step, therefore, requires automation which is incapable of obstructing the flow of operation from the step of extrusion through the step of surface treatment.

The automation of the racking step dictates the precondition of ensuring racking of materials of varying sizes all together and allowing insertion of suitable intervals between the materials proportionately to their sizes (peripheral length, height, and width) for the sake of uniformizing the thicknesses of an oxide film and an applied coating and the coloration in the course of the surface treatment and, therefore, allowing free alteration of the pitch between the adjacent materials suspended by the carrier bar. The necessary alteration in the pitch during the conveyance of materials on the conveyor to the framing station necessitates a method for varying the speed of both or either of the feed conveyor and the arranging conveyor. To be specific, the automation of the racking operation requires (A) adjustment to the pitch designated for the materials of a particular shape, (B) adoption of a jig mechanism capable of allowing free alteration in the pitch, and (C) fabrication of the materials in the particular shape fit therefore.

The racking method disclosed in Japanese Patent Publications No. 55-6119 and No. 55-6120 mentioned above fulfills the requirements (A) to (C) mentioned above as the preconditions for the automation of the racking step and avoids accidental fall of the materials under treatment and, therefore, is incapable of entailing various problems due to the unexpected fall of a material (when a material is suffered to fall into any of the baths in the line of surface-treating process, it will remain upright or aslant in the bath and stand in the way of subsequent materials being conveyed along the line of process).

In the method disclosed in the patent publications mentioned above, however, the formation of the notch in the material is accomplished by the operation of a rotary blade performed on the material being temporarily seized with a seizing device at a point along the length of the conveyor. Thus, the automation of the entire line of operation is difficult to attain because this formation of the notch interferes with the flow of the line from the step of extrusion through the step of surface treatment.

Since the work of forming the notch in the material is carried out at the framing station or the raw material station preceding the supply of materials to the framing station, it has the problem of inducing scatter of chips produced from the formation of the notch in the material during the erection of the carrier bar with the tumbler lifter, and consequently suffering the chips to drift and jeopardize the work environment and further suffering the chips to fall into and pile up in the baths (as for degreasing and rinsing with water) in the line of operation and consequently degrade the quality of the baths. Furthermore, the two cutting works, the one for cutting the fresh extruded material into fixed lengths and the other for forming the notch in each of the fixed-length profiles, are to be performed at different sites. The entire operation, therefore, is destitute of efficiency. The two work sites inevitably defiled with the chips of cutting require extra labor for cleaning. Further, the chips itself is liable to jeopardize the work environment.

SUMMARY OF THE INVENTION

An object of this invention, therefore, is to solve the problems of the prior art described above and provide a method for working terminal parts of materials subjected to vertical suspension type surface treatment, which method enables the work of cutting a fresh extruded material into fixed lengths and the work of forming a hook engaging part to be carried out simultaneously or continuously with high efficiency.

Another object of this invention is to provide a method for working terminal parts of materials subjected to vertical suspension type surface treatment, which method enables the chips of cutting to be swept at one fixed place, consequently allows the work of cleaning the site defiled with the chips to be carried out efficiently, and precludes the work environment from being gradually jeopardized with the chips.

Still another object of this invention is to provide a method for working terminal parts of materials subjected to vertical suspension type surface treatment, which method enables the work of cutting a fresh extruded material into fixed lengths and the work of forming a hook engaging part in each of the cut materials to be carried out simultaneously or continuously and consequently enables the entire operation from the step of extrusion through the step of surface treatment to be fully automated without posing any obstruction to the flow of the line of the operation.

Yet another object of this invention is to provide a method for forming a hook engaging part in the materials subjected to vertical suspension type surface treatment without entailing the troubles of the conventional method such as the jeopardization of the work environment due to the drift of the chips produced from the formation of a notch in the material, accumulation of the chips in the baths in the line of surface-treating operation, and the deterioration of quality of the baths.

A further object of this invention is to provide a method for forming a hook engaging part in the materials subjected to vertical suspension type surface treatment, which method allows the racking of the materials under treatment to the material nipping device to be carried out quickly, securely, and easily with freedom of alteration in the pitch between the materials suspended by a carrier bar.

To accomplish the objects described above, in accordance with the present invention, there is provided a method for working terminal parts of materials subjected to vertical suspension type surface treatment thereby forming in said terminal parts such hook engaging parts as to be engaged with nipping devices of a carrier bar serving to convey said materials successively to a series of surface-treating baths, which method is characterized in that said formation of said hook engaging parts in said terminal parts of the materials is carried out at the same time that or after the step of cutting an extruded material into fixed lengths is performed.

The formation of said hook engaging part may be executed by several modes. In one preferred mode, the formation of said hook engaging part in the shape of a groove, notch or hole is carried out at the same time or at the same site that the extruded material is cut into fixed lengths. In the second preferred mode, the formation of the hook engaging part is effected by doing a boring work or bending work with a press subsequent to the cutting of the extruded material into fixed lengths thereby giving rise to a hook engaging part of the shape of a hole or bend in the terminal part of each fixed-length material. In the third preferred mode, the work of grooving or the work of boring with a press is performed simultaneously with the work of cutting the extruded material into fixed lengths by shearing, thereby forming a hook engaging part of the shape of a groove or hole in the terminal part of each fixed-length material. Further, in another preferred mode, after the extruded material is cut into fixed lengths, a protuberant hook engaging part is formed on the terminal part of the fixed-length material by the welding technique while said material is in transit from the cutting station to an inspection table.

DETAILED DESCRIPTION OF THE PREFERRED EMBODIMENTS

Figure 1:
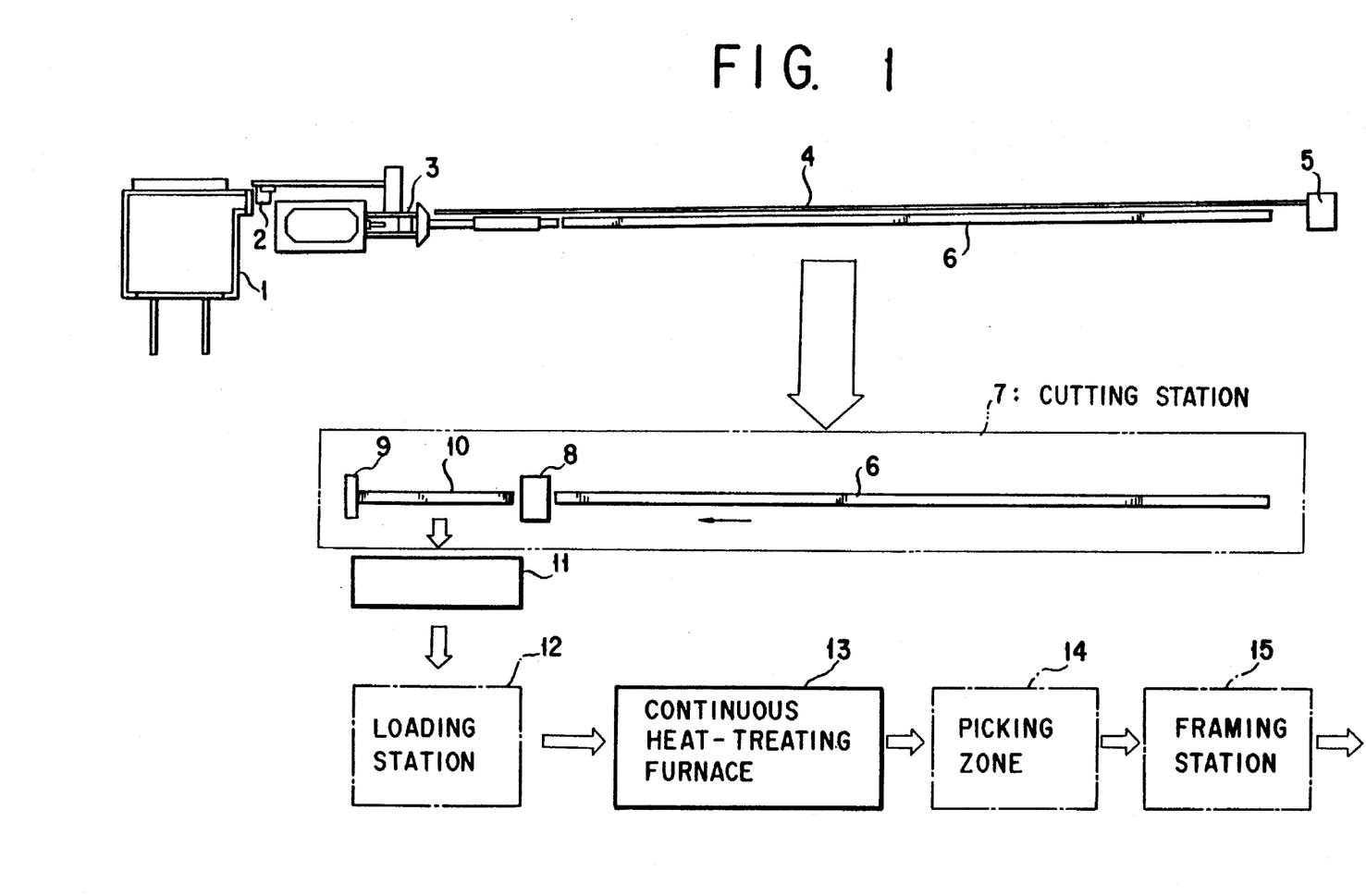
FIG. 1 is a flow chart of a line from the step of extruding an aluminum material to the step of surface-treating the material.

In the method for working the terminal part of a material subjected to vertical suspension type surface treatment by this invention, a hook engaging part is formed in several manners at the same time that or after the extruded material is cut into fixed lengths. Now, this method will be specifically described below with reference to the extruded material which is made of aluminum. As illustrated in FIG. 1, an aluminum ingot produced by casting is first homogenized by means of a homogenizing furnace 1 and then cut with a hot billet shear 2 into billets. The billets are introduced into an extruder 3 and extruded by being drawn with a puller 5 which is moved along a guide 4. A continuous-length material 6 which emanates from the extruder is forwarded by conveying means (indicated by a hollow arrow; similarly applicable herein below) to a cutting station 7 and then forwarded by a conveyor (not shown) until the leading terminal thereof collides against a stopper 9. The material now set still is cut with a fixed-length cutter 8 into fixed-length materials or fixed-length sections 10. The fixed-length materials 10 are forwarded to an inspection table 11, then loaded in several rows on a pallet in a loading station 12, forwarded to continuous heat-treating furnace 13 and heat-treated therein, forwarded through a picking zone 14 used for picking a picking material pallet and a rack for materials not subjected to surface treatment, subsequently hanged on the carrier bars (framing work) in a framing station 15, and coveyed to an anodic oxidation line of aluminum.

The fixed-length cutting mentioned above is performed on a collection of several continuous-length materials 6 at a time (in FIG. 1, one such continuous-length material is illustrated for the sake of convenience of drawing). When the work for forming a hook engaging part is carried out at this stage, therefore, it is accomplished with extremely high efficiency without posing any obstacle to the flow of line of the operation. In this manner, the chips of cutting occur only at one fixed site of work and the sweep of the chips is therefore effected conveniently.

Figure 2:
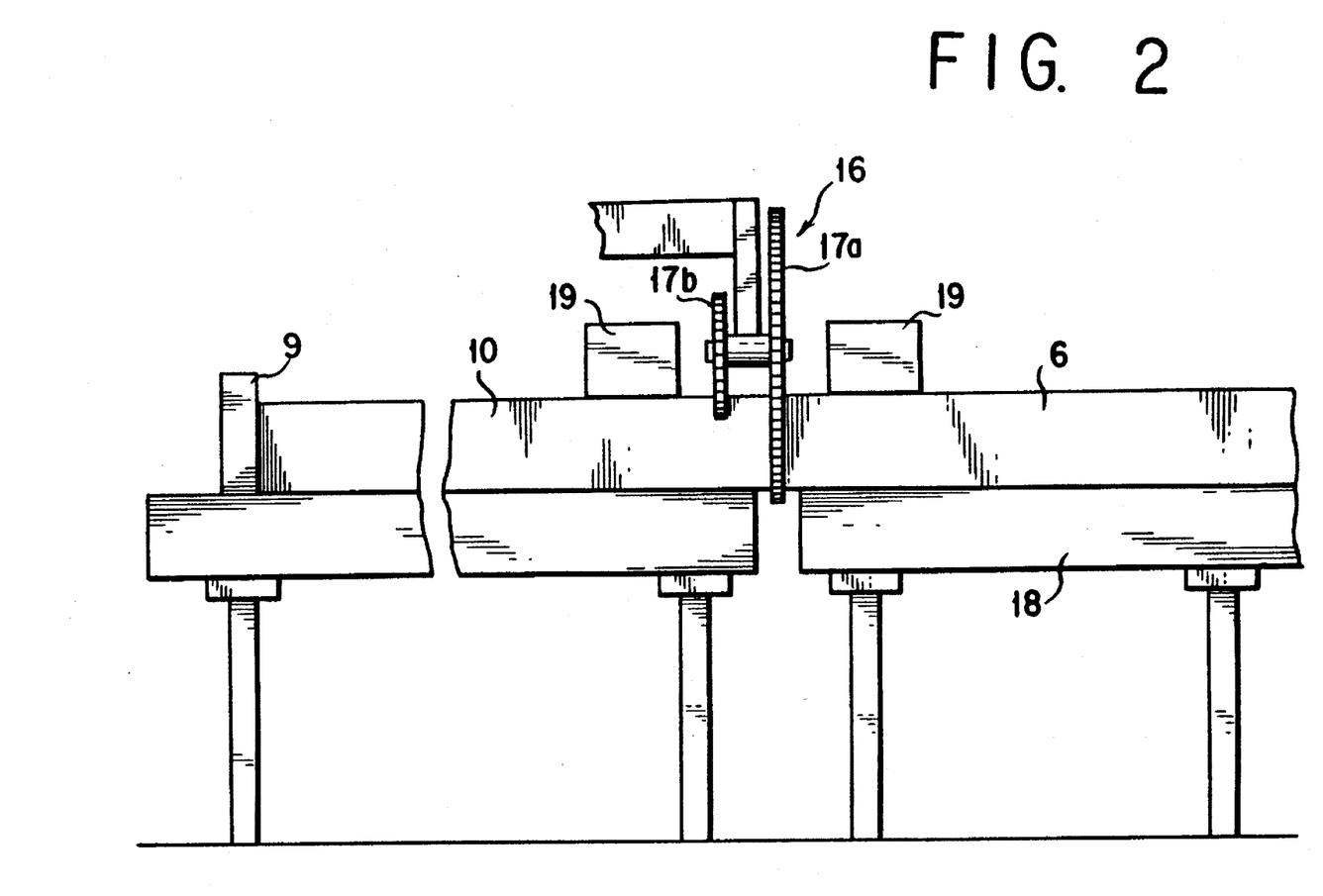
FIG. 2 is a schematic explanatory diagram illustrating one example of the method for working a terminal part of a material for vertical suspension type surface treatment contemplated by this invention.
Figure 3:
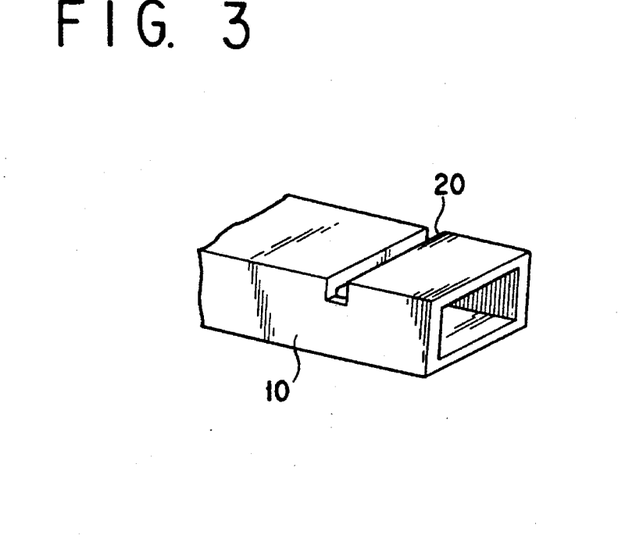
FIG. 3 is a perspective view of a terminal part of the material worked by the method illustrated in FIG. 2.

FIG. 2 illustrates an example of the working of a terminal part of material in the first embodiment of this invention. With the leading terminal of the continuous-length material 6 on a block conveyor 18 held in close contact with a stopper 9 and vises 19 closed to immobilize the continuous-length material 6 at two points, the one before and the other behind the prospective point for cutting, a cutting machine 16 having a cutting saw 17a of a large diameter and a notch-forming saw 17b of a small diameter adapted to be parallelly and integrally rotated is operated on the continuous-length material 6 so that the cutting saw 17a of a large diameter mentioned above cuts the extruded material 6 into a fixed length and, at the same time, the notch-forming saw 17b mentioned above forms a notch 20 shaped as shown in FIG. 3 in a fixed-length material 10 at a prescribed distance from cut edge.

Figure 4:
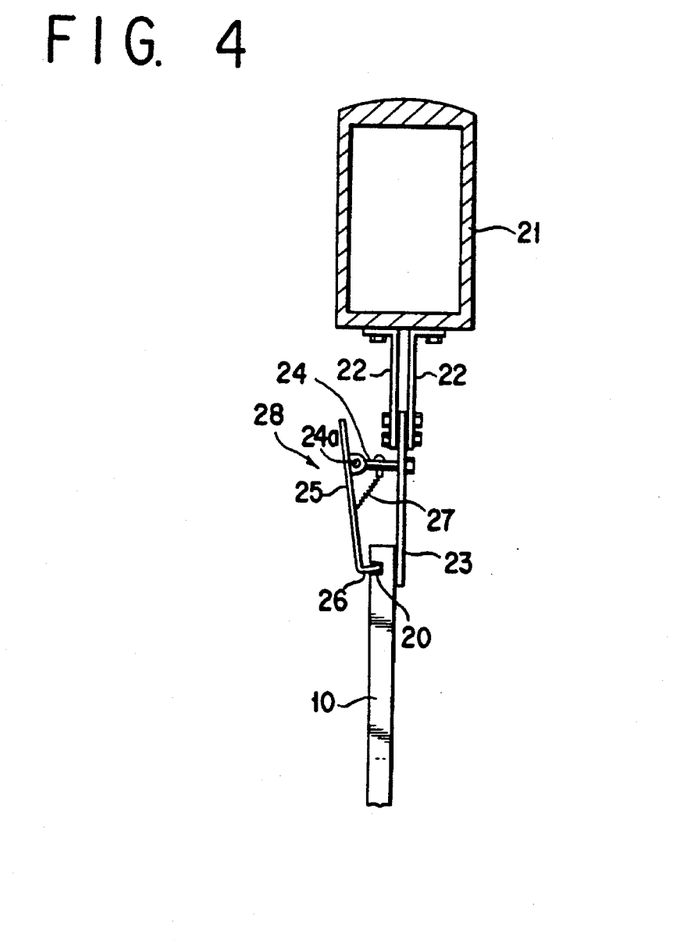
FIG. 4 is a partially sectioned side view illustrating one example of the state of engagement established between the shaped material shown in FIG. 3 and a nipping device of a carrier bar.

The notch 20 formed as described above is destined to serve as a hook engaging part during the work of framing. For example, the racking of the fixed-length material 10 on a carrier bar 21 is performed by using a nipping device (suspending jig) 28 as illustrated in FIG. 4. The suspending jig 28 comprises a conductive supporting plate 23 whose upper end is nipped and secured between the lower terminal parts of a pair of L-shaped suspending metal pieces 22, 22 attached fast to the lower surface of the carrier bar 21, a supporting member 24 provided projectingly on the supporting plate 23, and a depressing member 25 rotatably attached through the medium of an axial pin 24a to the leading terminal part of the supporting member 24, the leading terminal of the depressing member 25 being bent to form a hooking part 26. The retention of the material 10 by the suspending jig 28 in the nipped state is effected by allowing the hooking part 26 to be engaged with the notch 20 of the material 10 and causing the hooking part 26 of the depressing member 25 to be pressed against the supporting plate 23 by means of a spring 27 adapted to interconnect the depressing member 25 and the supporting plate 23.

Optionally, the cutting machine 16 illustrated in FIG. 2 may be set in place under the materials 6, 10 and adapted so that the fixed-length cutting will be carried out on the lower side of the materials and, at the same time, the notch will be formed in the lower surface of the material.

Figure 5:
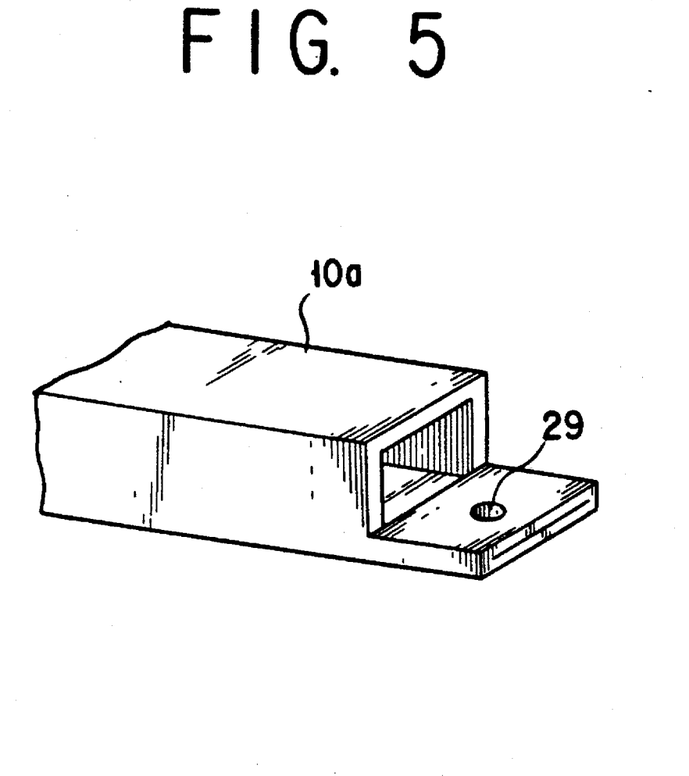
FIG. 5 is a perspective view of a terminal part of the material worked by another example of the method of this invention.
Figure 6:
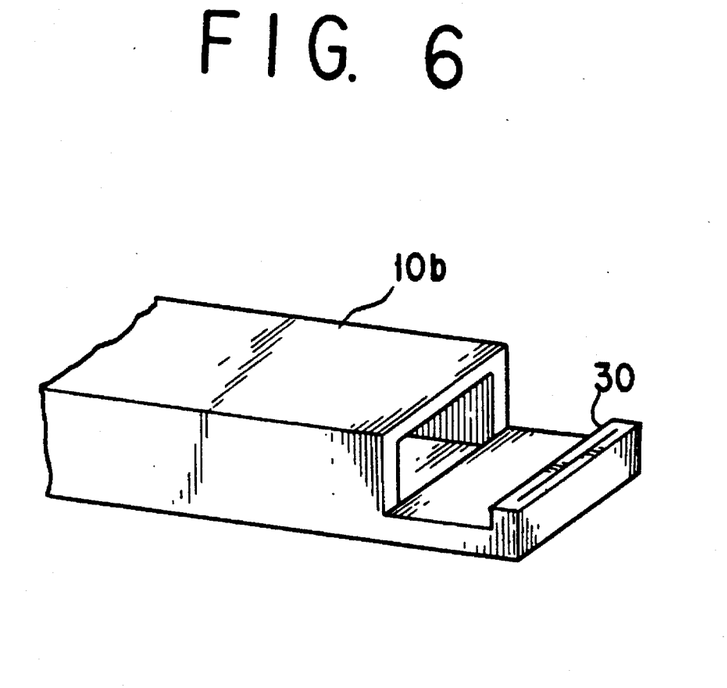
FIG. 6 is a perspective view of a terminal part of the material worked by yet another example of the method of this invention.

The terminal parts of the fixed-length materials 10a and 10b illustrated in FIG. 5 and FIG. 6 represent the outcomes of the working performed in the second embodiment of this invention. First, the continuous-length material 6 is cut into fixed lengths by the use of the cutting machine 16 constructed as illustrated in FIG. 2 and, at the same time, a cut shaped like a groove is inserted to prevent the material from being deformed under the impact of a press. Then, the cutting machine 16 is laterally moved and, at the same time, the press (not shown) installed alongside it is moved to and set fast at the site of cutting. The press is operated to press the terminal part of the fixed-length material 10a into a shape resembling a flat bar and, at the same time, a boring pin provided projectingly on the lower surface of the press is operated to form a hole 29 shaped as shown in FIG. 5. Otherwise, a bent part 30 shaped as shown in FIG. 6 is formed at the leading terminal of the shaped material 10b by the use of a metal mold. By the pressing work of a varying manner described above, a suitable hook engaging part is formed in the terminal part of the material. It is desirable to use a press die conforming to the shape expected to be obtained by the pressing work so as to prevent the pressed part of the shaped material from expanding over the width thereof irrespectively of the particular manner of pressing work to be employed. When the shaped material has its hollow interior collapsed and vanished under the impact of the pressing work, the press die may be adapted to impart an air vent to the collapsed part.

Figure 7:
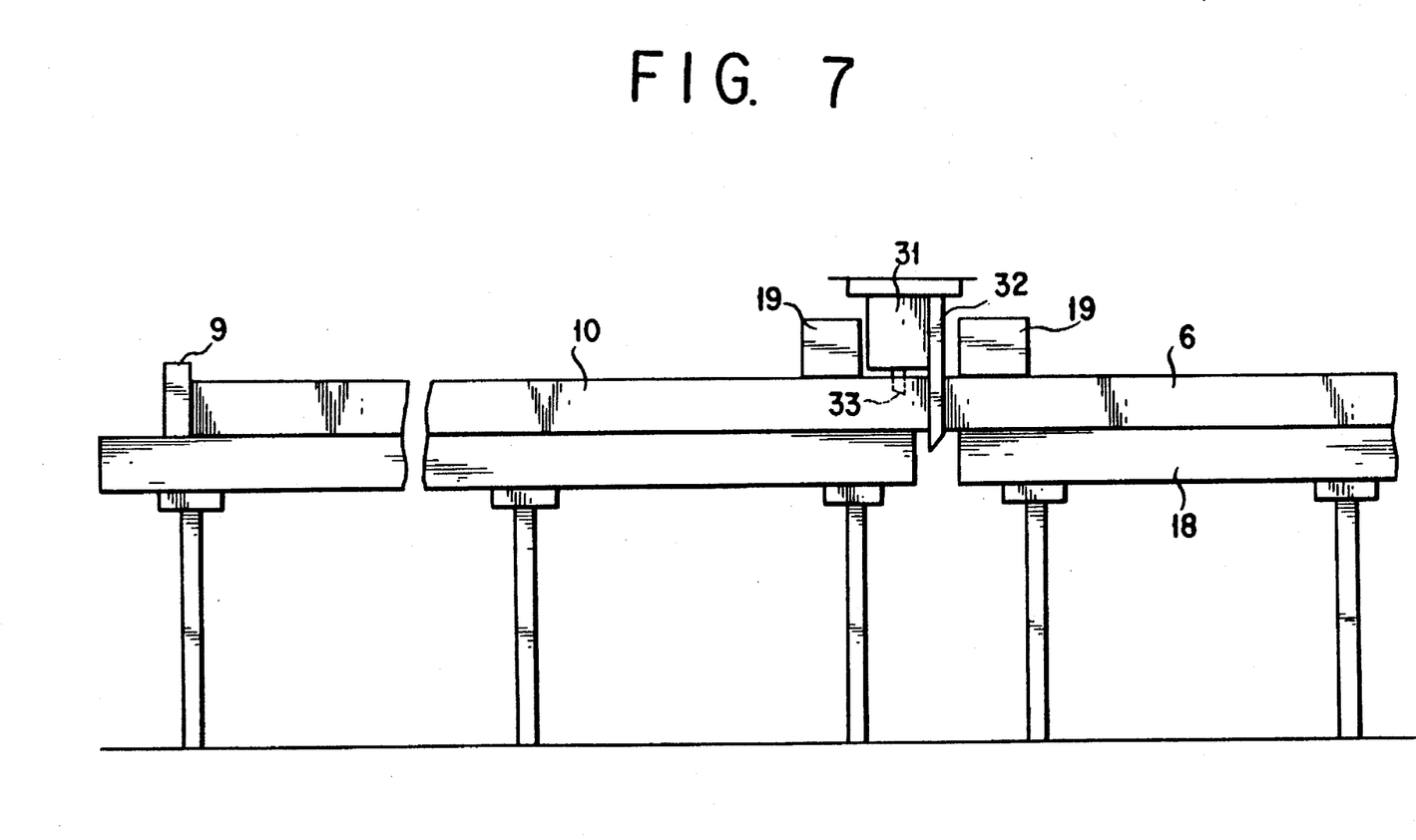
FIG. 7 is a schematic explanatory diagram illustrating another example of the method for working a terminal part of the material in accordance with this invention.
Figure 8:
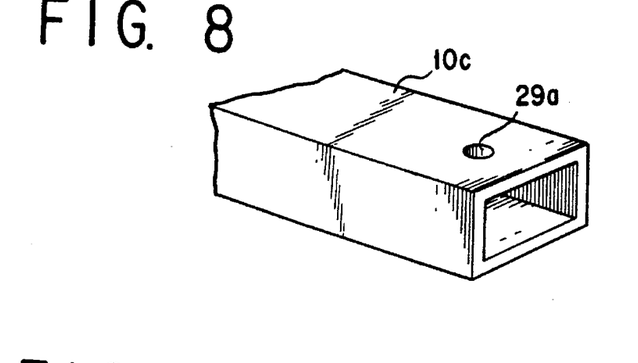
FIG. 8 is a perspective view of a terminal part of the material worked by the method illustrated in FIG. 7.
Figure 9:
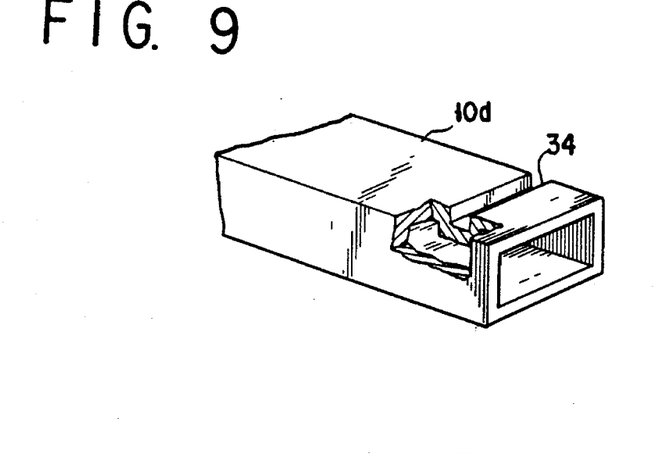
FIG. 9 is a partially cutaway perspective view of a terminal part of the material worked by another example of the method of this invention.

FIG. 7 represents an example of the work performed on the terminal part of the material in the third embodiment of this invention. In the place of the cutting machine 16 used for working the terminal part in the first embodiment illustrated in FIG. 2, a press 31 provided with a shearing blade 32 is operated to effect the fixed-length cutting and, at the same time, a needlelike boring pin 33 provided projectingly on the lower surface of the press 31 is operated to form a hole 29a shaped as shown in FIG. 8 in the fixed-length material 10c or a platelike pin (not shown) may be used to form a depressed groove 34 shaped as shown in FIG. 9 in the fixed-length material 10d. A double blade may be used as the shearing blade.

Figure 10:
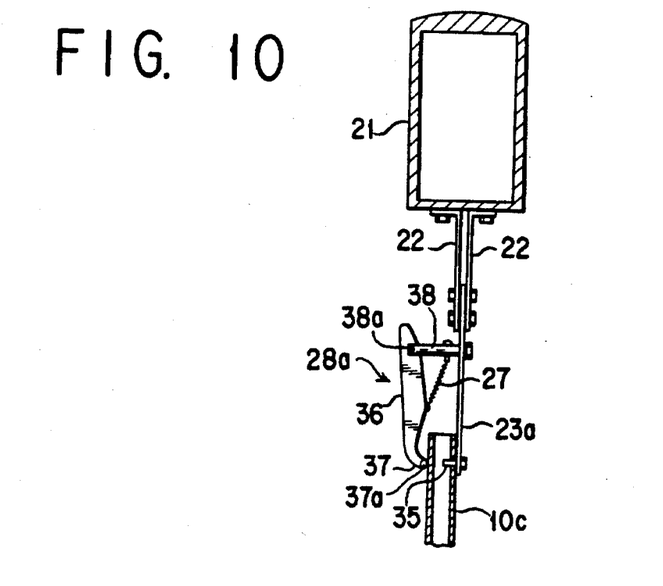
FIG. 10 is a partially sectioned side view illustrating the state of engagement between the shaped martial shown in FIG. 8 and another nipping device of the carrier bar.
Figure 11:
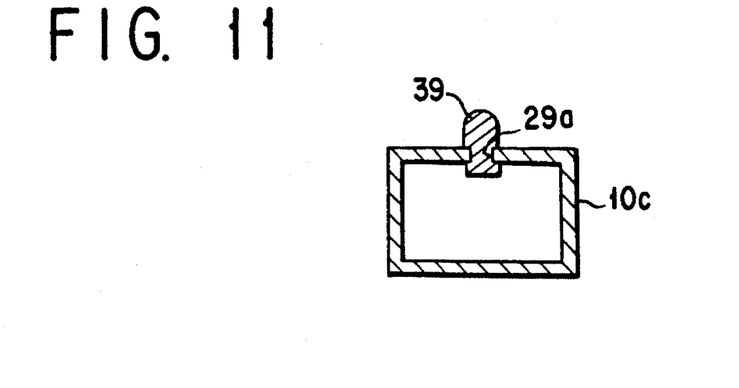
FIG. 11 is a cross section illustrating an example of the application of a hook engaging member to the shaped material shown in FIG. 8.

One example of the racking method to be employed for the shaped material 10c which has undergone the boring work as illustrated in FIG. 8 is shown in FIG. 10. In this case, the fixed-length shaped material 10c is nipped fast between the supporting plate 23a and the leading terminal part 37 of the depressing member 36 by causing a pin 35 attached projectingly to the leading terminal part of the supporting plate 23a of the nipping device 28a to be inserted home in the hole 29a of the fixed-length shaped material 10c and, at the same time, causing the leading terminal part 37 of the depressing member 36 rotatably attached to the supporting member 38 provided projectingly on the supporting plate 23a to be pressed against the fixed-length shaped material 10c by virtue of the pulling force of the spring 27. For the purpose of ensuring stable retention of the fixed-length shaped material 10c, the depressing member 36 may be provided at the leading terminal thereof as secured thereto with a retaining rod 37a projecting in the opposite lateral directions. As an alternative measure, a pin 39 provided with swelled parts one each at the opposite terminals thereof may be driven partly through the hole 29a formed in the terminal part of the fixed-length shaped material 10c as illustrated in FIG. 11 and a hooking part formed in the leading terminal part of the depressing member or supporting plate of the suspending jig may be hooked on the pin 39.

Figure 12:
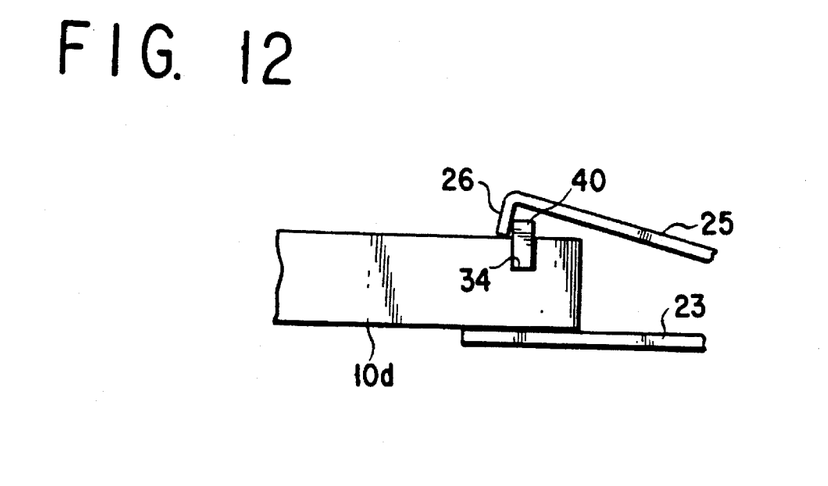
FIG. 12 is a partial side view illustrating the state of application of a hook engaging member to the shaped material shown in FIG. 9 and the state of engagement of the nipping device of the carrier bar therewith.
Figure 13:
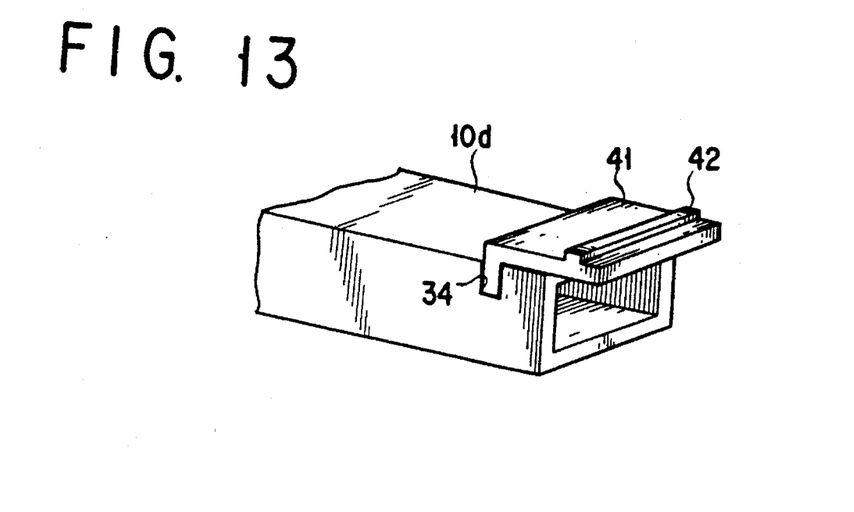
FIG. 13 is a partial perspective view illustrating an example of the application of another hook engaging member to the shaped material shown in FIG. 9.

FIG. 12 and FIG. 13 represent examples of the racking method applied to the shaped material 10d having the groove 34 formed as shown in FIG. 9. In the case of the racking method illustrated in FIG. 12, the fixed-length shaped material 10d is nipped fast between the hooking part 26 of the depressing member 25 and the supporting plate 23 by causing a platelike hook engaging member 40 formed of such a conductive metal as titanium, aluminum, or copper to be fitted home in the groove 34 of the fixed-length shaped material 10d and causing the hooking part 26 formed in the leading terminal part of the depressing member 25 (or supporting plate 23) of the suspending jig as illustrated in FIG. 4 to be hooked on the hook engaging member 40. Otherwise, the fast retention of the fixed-length shaped material 10d may be attained by causing the bent end portion of an L-shaped hook engaging member 41 provided on the front surface in the leading terminal part thereof with a raised ridge 42 to be inserted home in the groove 34 of the fixed-length shaped material 10d as illustrated in FIG. 13, causing the hooking part formed in the leading terminal part of the depressing member or supporting plate of the suspending jig to be hooked on the raised ridge 42 of the hook engaging member 41, and consequently allowing the hook engaging member 41 to be nipped therebetween.

The pinlike, platelike, or L-shaped hook engaging member which is intended to be inserted into the hole or groove formed in the terminal part of the fixed-length shaped material is desired to be made of a conductive substance.

Figure 14:
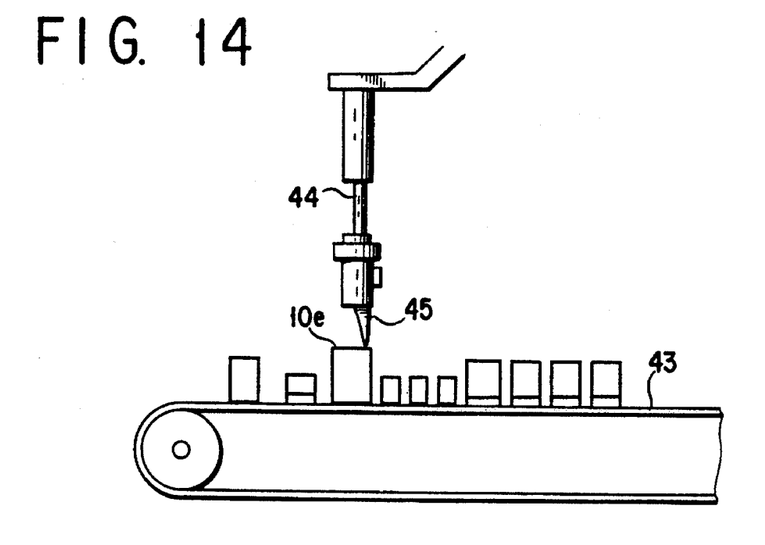
FIG. 14 is a schematic side view illustrating still another example of the method of this invention.

FIG. 14 represents an example of the work performed on the terminal part of the material in the fourth embodiment of this invention. In this embodiment, a hook engaging part in the form of a protuberant weld bead is formed in the leading terminal part of the fixed-length shaped material 10e by the welding method while the shaped material is in transit from the site of cutting to the inspection table 11 (see FIG. 1). To be more specific, a welding head 45 of a welding machine 44 set in place above the fixed-length materials 10e which are conveyed on the conveyor 43 is moved vertically in conformity with the particular shape of each of the materials 10e and operated to weld a ridged bead in the form of a line or dots on the upper surface of the terminal part of the material 10e. Optionally, the welding may be made from above as described above and additionally from below simultaneously so as to give rise to a hook engaging part which is composed of ridged weld beads deposited on the upper and lower surfaces of the terminal part of the material 10e. Alternatively, the formation of a protuberant hook engaging part can be carried out by applying a conductor wire (such as, for example, a round wire or an angular wire of aluminum) to the lower surface of the terminal part of the material 10e protruding from the conveyor 43 and continuously welding the wire to the lower surface of the terminal part of each of the plurality of materials 10e while keeping the conductor wire supplied to the site of welding, thereby giving rise to a hook engaging part made of conductor wire.

The working of the terminal part described above may be performed on the cut edge side of the fixed-length material or on the edge side thereof destined to collide against the stopper.

Figure 15:
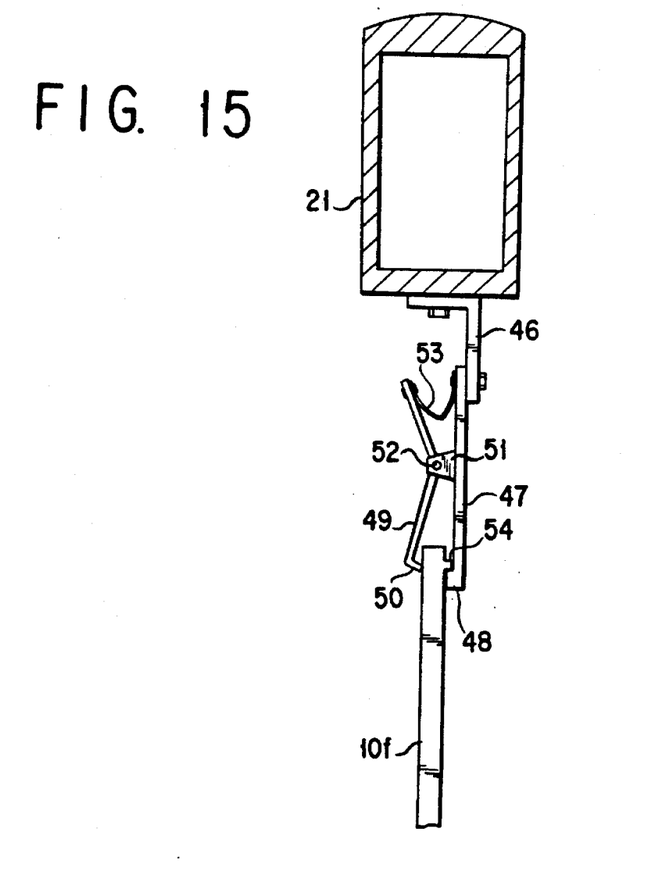
FIG. 15 is a partially sectioned side view illustrating another example of the racking operation performed by the use of another nipping device for the material under treatment having a hook engaging part formed thereon in accordance with the present invention.

FIG. 15 represents an example of the racking method applied to the fixed-length material 10f having the protuberant hook engaging part formed on the terminal part thereof by the welding process mentioned above. The racking is effected by causing the hooking part 48 of the suspending jig to be hooked on a hook engaging part 54 which is formed on the surface of the terminal part of the material 10f. To be more specific, the fixed-length material 10f is nipped fast between a hooking part 48 formed by bending the leading terminal of a supporting plate 47 supported by an L-shaped metal piece 46 fixed to the lower surface of the carrier bar 21 and a leading terminal part 50 of a depressing member 49 rotatably attached through the medium of an axial pin 52 to a supporting member 51 formed projectingly on the supporting plate 47 by causing the hooking part 48 to be hooked on the hook engaging part 54 of the fixed-length material 10f mentioned above and, at the same time, causing the leading terminal part 50 of the depressing member 49 to be pressed against the material 10f by means of a leaf spring 53.

Figure 16:
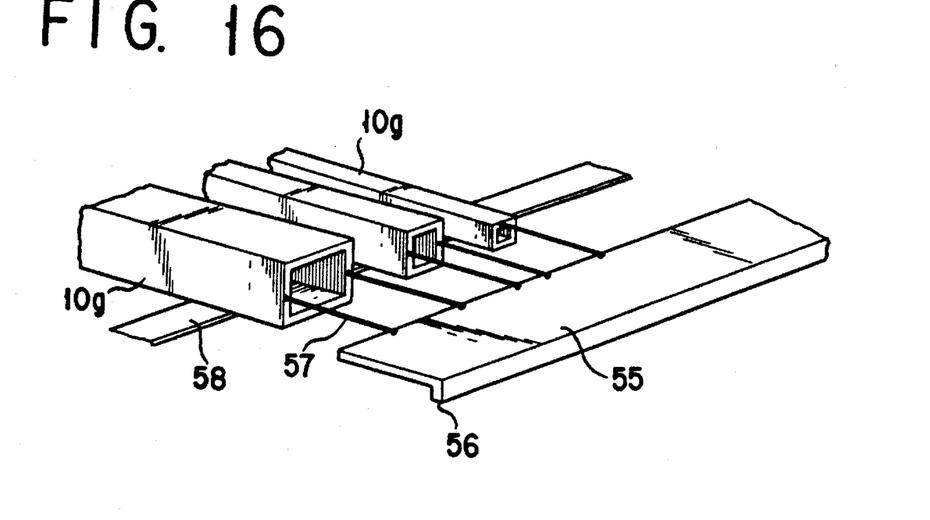
FIG. 16 is a partial perspective view illustrating another example of work performed in the terminal part of the material.
Figure 17:
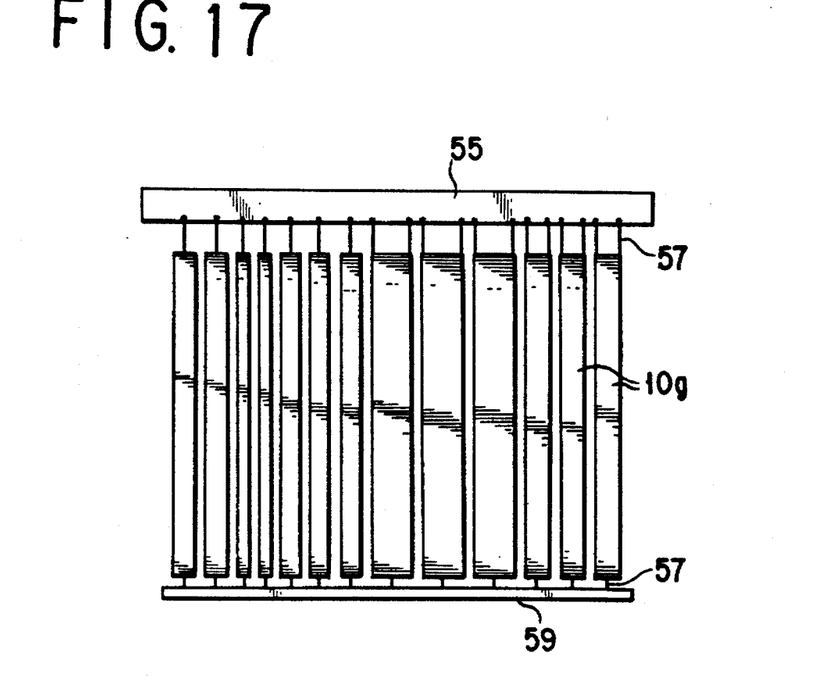
FIG. 17 is a plan view of the material having the terminal part thereof worked by the method shown in FIG. 16.

FIG. 16 and FIG. 17 represent other examples of the working of a terminal part by the welding method. While the fixed-length materials 10g are being advanced on a conveyor 58, so many Al wires (aluminum wires) 57 as to be proportionated to the size of the fixed-length materials are welded between one lateral side of a framing auxiliary plate 55 made of a conductive substance and provided with a hook engaging part 56 formed by bending the other lateral side thereof in the shape of the letter L and the terminal parts of the fixed-length materials 10g. These Al wires are welded at one point or at a plurality of points in due consideration of the balance of weight, with the terminal parts of the Al wires on the fixed-length material side being disposed as aligned with the end surfaces of the materials or on the inner surfaces of the terminal parts of the materials. For the purpose of preventing the fixed-length materials 10g from shaking and overlapping one another while in conveyance, the Al wires 57 are desired to be similarly welded between the remaining terminal parts of the materials and a platelike strip 59 as illustrated in FIG. 17. In this case, the number of Al wires to be used may equal that of the shaped materials. The welding pitch between the adjacent materials is varied depending on the width of the materials so that the projected areas on the electrodes in the treating baths will approximate to a fixed value. In the work of framing, the framing auxiliary plate 55 is nipped fast between the depressing member and the supporting plate of the suspending jig by causing the hooking part formed at the leading terminal of the depressing member or supporting plate of the suspending jig to be hooked on the hook engaging part 56 formed on the framing auxiliary plate 55. The series of surface treatments inclusive of the treatment for the formation of an anodic oxide film are carried out with the frame auxiliary plate 55 being used as a path for the flow of electric current. The removal of the framing auxiliary plate 55 and the platelike strip 59 from the materials 10g is effected by breaking the Al wires 57 by means of pressing or shearing, for example. Optionally, the Al wires may be substituted by wire of other conductive substance.

The framing method which is performed as described above brings about the following advantages: (a) In the subsequent coloring process, the possibility of the color of the outer surface of the fixed-length material being impaired by the flow of the aqueous solution of acid or alkali is remote because of the absence of Al wire from the outer surface. (b) The materials are easily supported in balance and, then suspended, are not easily inclined but are stabilized. (c) The framing can be effected efficiently because the pitch between the adjacent materials is not affected by the suspending jig. (d) Since the projected areas are approximated to a fixed value, the uniformity of electric current among the materials during the anodic oxidation and electrolytic coloring process is not easily impaired and the products of such treatments enjoy improvement in quality. (e) The outcomes of surface treatments can be prevented from being impaired as by the overlapping of materials by fixing the remaining terminals of the materials as with the strip. (f) Since the materials in themselves are not required to be cut, the possibility of chips arising from cutting, adhering to the materials, and consequently inflicting damage thereon is nil.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

What is claimed is:

1. In a method for working a terminal part of a fixed length of material subjected to vertical suspension type surface treatment by extruding an elongated member, cutting the elongated member into a fixed length of material with a terminal part and forming in said terminal part a hook engaging part to be engaged with a nipping device of a carrier bar serving to convey said fixed length of material successively to a series of surface-treating baths, the improvement comprising carrying out the step of forming said hook engaging part in said terminal part of the material at the same time as performing the step of cutting the elongated member into a fixed length of material.

2. In a method according to claim 1, wherein said hook engaging part is formed in the shape of a groove, notch or hole.

3. In a method according to claim 2, wherein said step of forming the hook engaging part and the step of cutting is effected by the use of a cutting machine comprising a cutting saw of a large diameter and a notch-forming saw of a small diameter both adapted to be parallely and integrally rotated so that said cutting saw performs the step of cutting of said elongated member into the fixed length of material and, at the same time, said notch-forming saw imparts a notch to the terminal part at a prescribed distance from a cut edge of the fixed length of material.

4. In a method according to claim 2, wherein said cutting of said elongated member into the fixed length of material is effected by shearing and, at the same time, the step of forming said hook engaging part in the shape of a groove or hole in the terminal part of said material is effected by grooving or boring.

5. In a method according to claim 4, wherein a press, which is provided with a shearing blade and has a boring pin projecting from a lower surface of the press, is operated to effect the cutting of said elongated member into the fixed length of material by means of said shearing blade and, at the same time, forming a hole by means of said boring pin.

6. In a method according to claim 4, wherein a press, which is provided with a shearing blade and has platelike pin projecting from a lower surface of the press, is operated to effect the cutting of said elongated member into the fixed length of material by means of said shearing blade and, at the same time, forming a groove of the shape of a depression by means of said pain.

7. In a method for working a terminal part of a member subjected to vertical suspension type surface treatment by forming in said terminal part a hook engaging part to be engaged with a nipping device of a carrier bar serving to convey said member successively to a series of surface-treating baths, the improvement comprising providing a cutting machine comprising a cutting saw of a large diameter and a notch-forming saw of a small diameter both adapted to be parallely and integrally rotated, and utilizing said cutting machine for cutting an extruded material into a member of a fixed length and, at the same time, forming a notch in the member of a fixed length at a prescribed distance from an end of the member to form said hook engaging part.

8. In a method for working a terminal part of a member subjected to vertical suspension type surface treatment by forming in said terminal part a hook engaging part to be engaged with a nipping device of a carrier bar serving to convey said member successively to a series of surface-treating baths, the improvement comprising cutting an extruded material into a member of a fixed length by shearing and, at the same time, forming the hook engaging part having a shape selected from a groove and hole in the terminal part of said member by the work of grooving and boring.

9. In a method according to claim 8, wherein a press provided with a shearing blade and having a boring pin projecting from the lower surface of press is operated to effect the cutting of said extruded material into the member by means of said shearing blade and, at the same time, the boring of a hole by means of said boring pin.

10. In a method according to claim 8, wherein a press provided with a shearing blade and having platelike pin projecting from the lower surface of press is operated to effect the cutting of said extruded material into the member by means of said shearing blade and, at the same time, the formation of a groove of the shape of a depression by means of said pin.

* * * * *